United States Patent
Hossain et al.

(10) Patent No.: US 11,740,691 B1
(45) Date of Patent: Aug. 29, 2023

(54) SENSOR ASSEMBLY FOR HEAD-MOUNTABLE DEVICE

(71) Applicant: Apple Inc., Cupertino, CA (US)

(72) Inventors: Muhammad F. Hossain, Cupertino, CA (US); Nicholas C. Soldner, Cupertino, CA (US); Hong Pan, Fremont, CA (US); Seth E. Woiszwillo, San Francisco, CA (US); Anthony Y. Fai, Shanghai (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/228,588

(22) Filed: Apr. 12, 2021

Related U.S. Application Data (60) Provisional application No. 63/022,326, filed on May 8, 2020.

(51) Int. Cl.
*G06F 3/01* (2006.01)
*G06F 1/16* (2006.01)
*G01C 19/5783* (2012.01)

(52) U.S. Cl.
CPC ......... *G06F 3/012* (2013.01); *G01C 19/5783* (2013.01); *G06F 1/163* (2013.01)

(58) Field of Classification Search
None
See application file for complete search history.

(56) References Cited

U.S. PATENT DOCUMENTS

| | | | |
|---|---|---|---|
| 8,957,835 B2 * | 2/2015 | Hoellwarth | G06F 3/16 345/8 |
| 9,776,084 B2 | 10/2017 | Allin et al. | |
| 2012/0249797 A1 * | 10/2012 | Haddick | G04G 21/04 701/491 |
| 2014/0182124 A1 * | 7/2014 | Louderback | H04B 10/2581 29/825 |
| 2015/0234501 A1 | 8/2015 | Lyons | |
| 2015/0248845 A1 | 9/2015 | Postlethwaite et al. | |
| 2017/0059319 A1 * | 3/2017 | Feng | G01C 25/00 |
| 2019/0035154 A1 | 1/2019 | Liu | |

* cited by examiner

*Primary Examiner* — Paul M. West
*Assistant Examiner* — Mark A Shabman
(74) *Attorney, Agent, or Firm* — BakerHostetler (57) ABSTRACT

A head-mountable device can securely support sensors in a manner that maintains their positions and orientations over time and avoids applying excessive strain on the sensors, thereby protecting them from harm. The sensor can be mounted on a flex circuit or circuit board, which is rigidly secured within an inner case, including for example a base and an inner shield. The inner case can be suspended within an outer case, including for example a frame and an outer shield. Shock absorbers on opposing sides of the inner case can flexibly couple the inner case to the outer case. The shock absorbers can dampen the effects of vibrations or other forces applied from the outer case. The inner case can decouple the sensor from strain applied from the shock absorbers.

20 Claims, 3 Drawing Sheets

SENSOR ASSEMBLY FOR HEAD-MOUNTABLE DEVICE

CROSS-REFERENCE TO RELATED APPLICATION

This application claims the benefit of U.S. Provisional Application No. 63/022,326, entitled "SENSOR ASSEMBLY FOR HEAD-MOUNTABLE DEVICE," filed May 8, 2020, the entirety of which is incorporated herein by reference.

TECHNICAL FIELD

The present description relates generally to sensor assemblies, and, more particularly, to sensor assemblies for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mounted displays, headsets, visors, smartglasses, head-up display, etc., can perform a range of functions that are managed by the components (e.g., sensors, circuitry, and other hardware) included with the wearable device. The head-mountable device can provide a user experience that is immersive or otherwise natural so the user can easily focus on enjoying the experience without being distracted by the mechanisms of the head-mountable device.

Many of the functions performed by a head-mountable device can be based, at least in part, on detections made by one or more sensors that are mounted on board the head-mountable device. Such sensors can provide information regarding, for example, the position, orientation, and/or movement of the head-mountable device and/or the user. It can be desirable to maintain the sensor in a fixed position and orientation relative to other portions of the head-mountable device throughout the service life of the head-mountable device to provide accurate information regarding the position, orientation, and/or movement. However, some mounting systems can allow the position and orientation of the sensor to be altered over time and/or during traumatic events, such as a drop or other impact. Other mounting systems can place excessive strain on the sensors, which can be sensitive to such conditions and have diminished effectiveness thereafter. Additionally, a head-mountable device can include various components, such a motors and fans, that apply vibrations and other forces to the sensors, thereby causing potential harm to the sensors if not properly mitigated.

Systems of the present disclosure can provide a head-mountable device that securely supports sensors in a manner that maintains their positions and orientations over time and avoids applying excessive strain on the sensors, thereby protecting them from harm. The sensor can be mounted on a flex circuit or circuit board, which is rigidly secured within an inner case, including for example a base and an inner shield. The inner case can be suspended within an outer case, including for example a frame and an outer shield. Shock absorbers on opposing sides of the inner case can flexibly couple the inner case to the outer case. The shock absorbers can dampen the effects of vibrations or other forces applied from the outer case. The inner case can decouple the sensor from strain applied from the shock absorbers.

Accordingly, the sensor assemblies described herein facilitate effective performance of sensors mounted therein. The sensor assemblies provides high robustness during the entirety of the service life of the head-mountable device without placing strain on the sensors themselves. The shock absorbers can be tuned to dampen particular frequencies, such as those produced by other components of the head-mountable device. The sensor assemblies further enable the mounting of sensors on a flex circuit, where desired.

These and other embodiments are discussed below with reference to FIGS. 1-7.

However, those skilled in the art will readily appreciate that the detailed description given herein with respect to these Figures is for explanatory purposes only and should not be construed as limiting.

Figure 1:
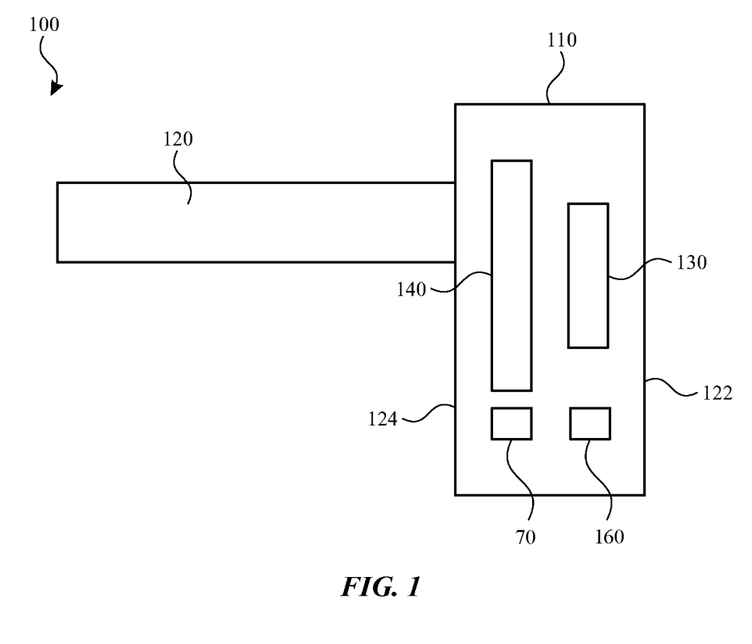
FIG. 1 illustrates a side view of a head-mountable device, according to some embodiments of the present disclosure.

According to some embodiments, for example as shown in FIG. 1, a head-mountable device 100 includes a frame 110 that is worn on a head of a user. The frame 110 can be positioned in front of the eyes of a user to provide information within a field of view of the user. The frame 110 can provide nose pads or another feature to rest on a user's nose. The frame 110 can be supported on a user's head with the securement element 120. The securement element 120 can wrap or extend along opposing sides of a user's head. The securement element 120 can include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated components of the head-mountable device 100. By further example, the securement element 120 can include multiple components to engage a user's head.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the securement element 120 of the head-mountable device 100.

The frame 110 can include and/or support one or more camera modules 130. The camera modules 130 can be positioned on or near an outer side 122 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the camera modules 130 can be movable along the outer side 122. For example, a track or other guide can be provided for facilitating movement of the camera module 130 therein.

The head-mountable device 100 can include display modules 140 that provide visual output for viewing by a user wearing the head-mountable device 100. One or more display modules 140 can be positioned on or near an inner side 124 of the frame 110. As used herein, an inner side 124 of a portion of a head-mountable device is a side that faces toward the user and/or away from the external environment.

A display module 140 can transmit light from a physical environment (e.g., as captured by a camera module) for viewing by the user. Such a display module 140 can include optical properties, such as lenses for vision correction based on incoming light from the physical environment. Additionally or alternatively, a display module 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The head-mountable device 100 can include one or more sensors 70. The sensors 70 can be mounted to the frame 110 in a secure manner, as described further herein. Any number and type of sensors can be provided. For example, the sensors 70 can be or include an inertial measurement unit ("IMU") that provides information regarding a characteristic of the head-mountable device 100, such as inertial angles thereof. For example, the IMU can include a six-degrees of freedom IMU that calculates the position, velocity, and/or acceleration of the head-mountable device 100 based on six degrees of freedom (x, y, z, $\theta_x$, $\theta_y$, and $\theta_z$). The IMU can include one or more of an accelerometer, a gyroscope, and/or a magnetometer. Additionally or alternatively, the sensors 70 can detect motion characteristics of the head-mountable device 100 with one or more other motion sensors, such as an accelerometer, a gyroscope, a global positioning sensor, a tilt sensor, and so on for detecting movement and acceleration of the head-mountable device 100. The sensors 70 can provide data to a controller for processing. Such data can influence other operations of the head-mountable device 100, such as the information provided on the display module 140.

It will be understood that the head-mountable device 100 can include a variety of other components, including vibration-generating components 160. Vibration-generating components 160 can include any components that move or effect the movement of other components of the head-mountable device 100. For example, vibration-generating components 160 can include one or more motors for moving one or both of the display modules 140. The motors can be operated to move one or both of the display modules 140 relative to the frame 110 and/or relative to each other. By further example, vibration-generating components 160 can include one or more fans for moving air through and/or against components of the head-mountable device 100. The fans can be operated to cool components of the head-mountable device and maintain such components at acceptable and/or preferred temperatures.

It will be understood that motors, fans, and/or other vibration-generating components of a head-mountable device 100 can produce vibrations and/or other forces that propagate throughout the head-mountable device 100. Such vibrations can interfere with the accuracy of measurements made by the sensors 70. Additionally, such vibrations can cause harm to the sensors 70 over time. Sensor assemblies described herein mitigate the effects of such vibrations as well as other shock and forces applied thereto.

Figure 2:
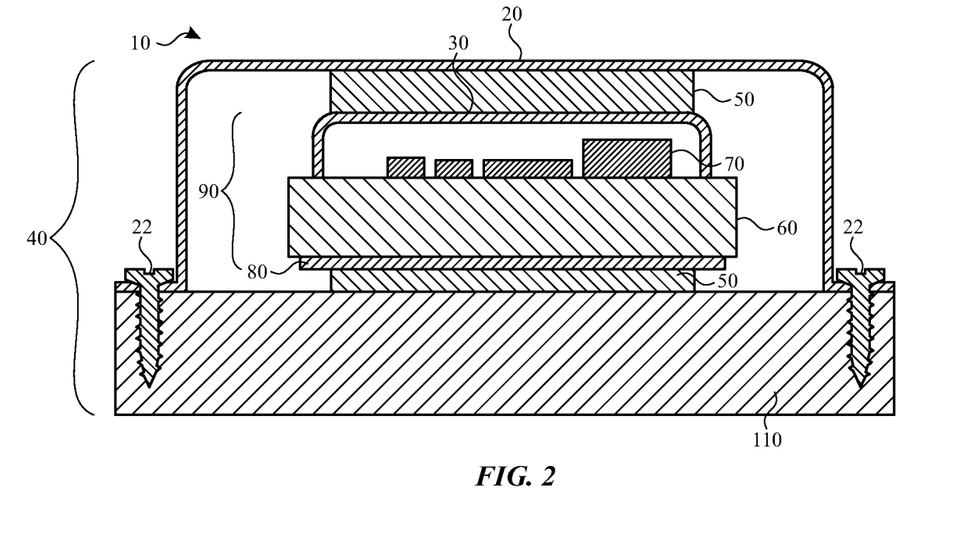
FIG. 2 illustrates a sectional view of a sensor assembly of the head-mountable device of FIG. 1, according to some embodiments of the present disclosure.

Referring now to FIG. 2, a sensor assembly can be provided to securely support one or more sensors of a head-mountable device while simultaneously protecting the sensors from vibrations and other forces applied to the assembly. It will be understood that the assembly described herein can be one of multiple assemblies and can include one or more other components of the head-mountable device. It will be further understood that a sensor assembly can be integrated into the head-mountable device and/or provided as a module thereto.

As shown in FIG. 2, a sensor assembly 10 can include one or more sensors 70 housed within protective cases. An outer case 40 of the sensor assembly 10 can include an outer shield 20 it is securely coupled to the frame 110 or another component of the head-mountable device (e.g., by a fastener 22). The outer shield 20 can be removably, reversibly, and/or adjustably coupled to the frame 110.

The outer case 40 can define a region therein that is at least partially enclosed. Within this region, the sensor assembly 10 can provide an inner case 90. The inner case 90 of the sensor assembly 10 can include an inner shield 30, a circuit 60, and/or a base 80. The one or more sensors 70 of the sensor assembly 10 can be secured within the inner case 90.

The one or more sensors 70 of the sensor assembly 10 can be mounted to a circuit 60 in the form of a flex circuit that operably connects the sensors 70 of the sensor assembly 10 to each other and/or other components. As used herein, "flexible circuit" or "flex circuit" is a structure that includes a conductive layer, an insulation layer, and optionally a substrate layer. A flex circuit can be provided in electrical communication with at least one electrode, terminal, and/or connector. A flex circuit forms circuitry that includes a pattern of conductors of the conductive layer typically in the form of pads, which are typically formed on a surface of an insulating material of the insulation layer. Such circuitry is typically metallic, such as of a copper or copper alloy. In general, a flex circuit is thin, having a total thickness of from about 1 mm to about 30 mm. A flex circuit is generally flexible, such that it can conform to contours of other components. A flex circuit may be any suitable size, and constructed in any suitable shape. For example, the size of a flex circuit may be determined by the power requirements of the components connected thereto, the conductivity of the flex circuit, the distance between operably connected components, or any other suitable criteria.

Providing operable connections to and from the sensors 70 via a flex circuit can facilitate such connections while occupying little space within the head-mountable device. Additionally, a flex circuit can conform and bend around other components of the head-mountable device. These features can help the head-mountable device maintain a low weight a small size.

Where the circuit 60 is a flex circuit, the inner case 90 can securely clamped to a portion of the circuit 60 by surrounding such a portion with the base 80 and the inner shield 30. The sensors 70 can be secured and/or suspended between the inner shield 30 and the base 80 without being subjected to strain from the clamping force applied to the circuit 60. The flex circuit can extend out of the inner case 90 and to other components to operably connect the sensors 70 to a controller of and/or other components of the head-mountable device. For example, the flex circuit can have, at one or more ends thereof, a connector (not shown) for providing electrical communication through the circuitry of the flex circuit to other components. It will be understood that other mechanisms can be provided in addition to and/or in place of the flex circuit. For example, operable connections can be made with any conductive circuit, wires, leads, and/or connectors between components.

Additionally or alternatively, the circuit 60 can be or include a circuit board that provides a rigid substrate with electrical connections between components and/or to other components. Where the circuit 60 includes a rigid circuit board, the base 80 can optionally be omitted, and the circuit 60 can define, along with the inner shield 30, the inner case 90.

The inner case 90 can be coupled to the outer case 40 by one or more shock absorbers 50 of the sensor assembly 10. As shown in FIG. 2, the inner case 90 can be suspended within the region defined by the outer case 40. As such, the inner case 90 can be connected to other components of the head-mountable device exclusively through the shock absorbers 50.

The shock absorbers 50 can be formed from an elastic or other deformable material. The shock absorbers 50 can include a foam body, an elastomer, a rubber, silicone, another polymer, cork, a matrix material, or another material having elastic properties. The shock absorbers 50 can be coupled to adjacent structures by an adhesive, such as pressure-sensitive adhesive that is activated upon compression. For example, one of the shock absorbers 50 can be coupled to and compressed between the outer shield 20 and the inner shield 30. Another one of shock absorbers 50 can be can be coupled to and compressed between the frame 110 and the base 80 and/or the circuit 60.

While within the outer case 40, and while the head-mountable device is at rest, the shock absorbers 50 can be under compression, such that they apply a clamping force to the components of the inner case 90 and bias them towards each other and/or onto the circuit 60. The compression of the shock absorbers 50 can be achieved and/or adjusted, for example, by adjusting the fasteners 22 coupling the outer shield 20 to the frame 110. The clamping force can be applied to the circuit 60 without being transmitted to the sensors 70. As such, the sensors 70 can be secured in place without being subjected to harmful strain.

In such an arrangement, the shock absorbers 50 are configured to elastically deform to absorb and/or dampen strain, vibration, and forces applied from the outer case 40, such as that originating from other components (e.g., motor, fan, etc.) of the head-mountable device. The inner case 90 provides a rigid structure that decouples the sensors 70 from strain, vibration, and forces applied from the shock absorbers 50. In particular, the inner case 90 transfers forces onto and against is constituent parts (e.g., inner shield 30, base, 80, and/or circuit 60) rather than into the sensors 70.

It will be understood that shock absorption can be provided by other components of the assembly sensor assembly 10. For example, the outer shield 20 can directly and resiliently apply a biasing force against the inner shield 30. By further example, the frame 110 can directly and resiliently apply a biasing force against the base 80 and/or the circuit 60. Biasing structures can be integrated into or coupled to such structures to provide, for example, a spring force.

Referring now to FIGS. 3-6, the shock absorbers can be provided with a structure and/or arrangement that most effectively absorbs and/or dampens strain, vibration, and forces applied thereto. The shock absorbers 50 can be provided in any number, location, orientation, and/or arrangement. For example, the shock absorbers 50 can be tuned to respond to vibrations occurring at frequencies generated by other components (e.g., motor, fan, etc.) of the head-mountable device. Where such frequencies are known, the shock absorbers 50 can be tuned accordingly.

Figure 3:
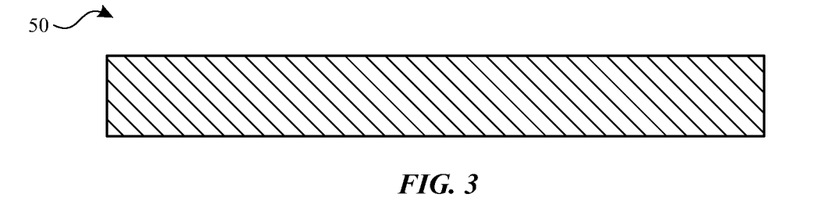
FIG. 3 illustrates a side view of a shock absorber of the sensor assembly of FIG. 2, according to some embodiments of the present disclosure.
Figure 4:
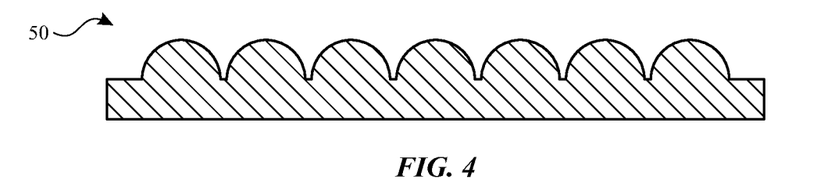
FIG. 4 illustrates a side view of a shock absorber of the sensor assembly of FIG. 2, according to some embodiments of the present disclosure.
Figure 5:
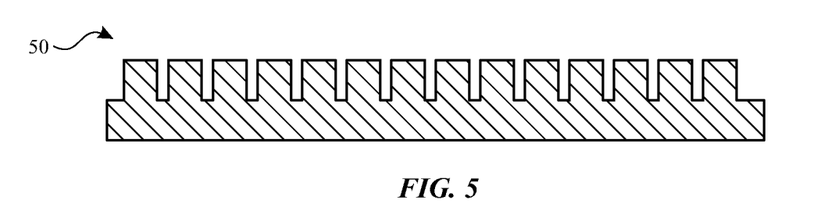
FIG. 5 illustrates a side view of a shock absorber of the sensor assembly of FIG. 2, according to some embodiments of the present disclosure.
Figure 6:
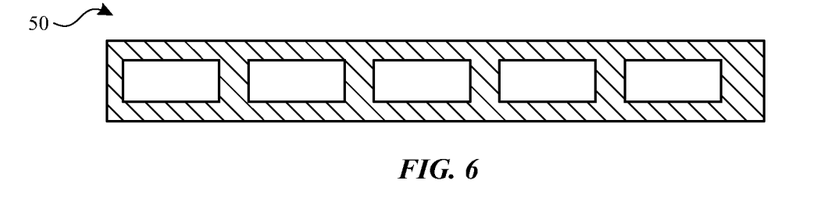
FIG. 6 illustrates a side view of a shock absorber of the sensor assembly of FIG. 2, according to some embodiments of the present disclosure.

As shown in FIG. 3, a shock absorber 50 can be formed as a continuous block having uniform dimensions along a length thereof. As shown in FIG. 4, a shock absorber 50 can be formed as a repeating pattern of protrusions (e.g., curved protrusions). As shown in FIG. 5, a shock absorber 50 can be formed as a repeating pattern of other protrusions (e.g., rectilinear protrusions). As shown in FIG. 6, a shock absorber 50 can be formed as a repeating pattern of openings (e.g., forming a mesh, lattice, etc.).

It will be understood that one or more shock absorbers 50 can be provided of a single type and/or of multiple types. It will be understood that any given shock absorber 50 can include features of a single repeating pattern, multiple repeating patterns, and/or a non-repeating shape. As such, the features can be selected to absorb different types (e.g., frequencies) of vibrations and/or provide different absorption properties at different locations. It will be understood that any given pair of shock absorbers can have the same or different features.

Figure 7:
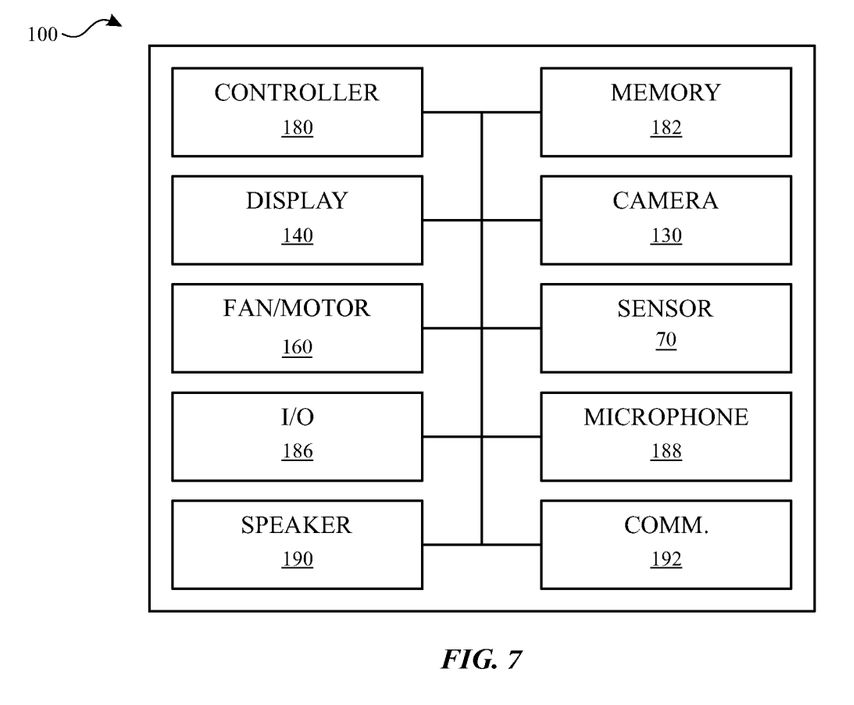
FIG. 7 illustrates a block diagram of a head-mountable device, in accordance with some embodiments of the present disclosure.

Referring now to FIG. 7, components of the head-mountable device can be operably connected to provide the performance described herein. FIG. 7 shows a simplified block diagram of an illustrative head-mountable device 100 in accordance with one embodiment of the invention. It will be appreciated that components described herein can be provided on either or both of a frame and/or a securement element of the head-mountable device 100. It will be understood that additional components, different components, or fewer components than those illustrated may be utilized within the scope of the subject disclosure.

As shown in FIG. 7, the head-mountable device 100 can include a controller 180 (e.g., control circuitry) with one or more processing units that include or are configured to access a memory 182 having instructions stored thereon. The instructions or computer programs may be configured to perform one or more of the operations or functions described with respect to the head-mountable device 100. The controller 180 can be implemented as any electronic device capable of processing, receiving, or transmitting data or instructions. For example, the controller 180 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. The memory 182 can include the memory of the flex circuit 170 described herein. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display module 140 for displaying visual information for a user. The display module 140 can provide visual (e.g., image or video) output. The display module 140 can be or include an opaque, transparent, and/or translucent display. The display module 140 may have a transparent or translucent medium through which light representative of images is directed to a user's eyes. The display module 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display module 140 for close up viewing. The optical subassembly can include one or more lenses, mirrors, or other optical devices.

The head-mountable device 100 can include vibration-generating components 160, such as a motor for moving one or more components of the head-mountable device 100 and/or a fan for moving air through and/or against components of the head-mountable device 100, as described herein.

The head-mountable device 100 can include one or more sensors 70, such as the sensors of a sensor assembly, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the controller 180 for detection of sound levels and communication of detections for further processing, as described further herein.

The head-mountable device 100 can include the speakers 190 as described herein. The speakers 190 can be operably connected to the controller 180 for control of speaker output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

While various embodiments and aspects of the present disclosure are illustrated with respect to a head-mountable device, it will be appreciated that the subject technology can encompass and be applied to other devices. For example, a sensor assembly in accordance with embodiments disclosed herein can be included with an electronic device that is moved while in use. Such an electronic device can be or include a desktop computing device, a laptop-computing device, a display, a television, a portable device, a phone, a tablet computing device, a mobile computing device, a wearable device, a watch, and/or a digital media player.

Accordingly, embodiments of the present disclosure provide a head-mountable device that securely supports sensors in a manner that maintains their positions and orientations over time and avoids applying excessive strain on the sensors, thereby protecting them from harm. The sensor assemblies described herein facilitate effective performance of sensors mounted therein. The sensor assemblies provides high robustness during the entirety of the service life of the head-mountable device without placing strain on the sensors themselves. The shock absorbers can be tuned to dampen particular frequencies, such as those produced by other components of the head-mountable device. The sensor assemblies further enable the mounting of sensors on a flex circuit, where desired.

Various examples of aspects of the disclosure are described below as clauses for convenience. These are provided as examples, and do not limit the subject technology.

Clause A: a head-mountable device comprising: a frame; an outer shield coupled to the frame; a base between the outer shield and the frame; an inner shield between the outer shield and the frame; a sensor mounted to a flex circuit, a portion of the flex circuit being secured between the base and the inner shield; a first shock absorber coupling the inner shield to the outer shield; and a second shock absorber coupling the base to the frame.

Clause B: a sensor assembly for a head-mountable device, the sensor assembly comprising: a sensor mounted between opposing sides of an inner case; and shock absorbers on opposing sides of the inner case and coupling the inner case to an outer case, wherein the shock absorbers are configured to elastically deform to absorb strain applied from the outer case, and the inner case decouples the sensor from strain applied from the shock absorbers.

Clause C: a sensor assembly for a head-mountable device, the sensor assembly comprising: a sensor mounted to a flex circuit; an inner case surrounding the sensor; and shock absorbers on opposing sides of the inner case and coupling the inner case to an outer case, wherein the shock absorbers clamp the inner case to a portion of the flex circuit.

One or more of the above clauses can include one or more of the features described below. It is noted that any of the following clauses may be combined in any combination with each other, and placed into a respective independent clause, e.g., clause A, B, or C.

Clause 1: an optical module; and a motor for moving the optical module, wherein the first shock absorber and the second shock absorber are configured to absorb vibrations at a frequency generated by the motor.

Clause 2: a fan for moving air through the head-mountable device, wherein the first shock absorber and the second shock absorber are configured to absorb vibrations at a frequency generated by the fan.

Clause 3: the first shock absorber is adhered to each of the inner shield and the outer shield; and the second shock absorber is adhered to each of the base and the frame.

Clause 4: the first shock absorber and the second shock absorber are under compression when the head-mountable device is at rest, and the inner shield and the base are clamped onto the flex circuit by the first shock absorber and the second shock absorber.

Clause 5: the first shock absorber and the second shock absorber are configured to elastically deform to absorb strain applied from the outer shield or the frame, and the base and the inner shield decouples the sensor from strain applied from the first shock absorber and the second shock absorber.

Clause 6: the sensor is an inertial measurement unit.

Clause 7: the sensor comprises an accelerometer, a gyroscope, or a magnetometer.

Clause 8: each of the frame, the outer shield, the base, and the inner shield are more rigid than each of the flex circuit, the first shock absorber, and the second shock absorber.

Clause 9: the shock absorbers, while under compression, apply a clamping force to the inner case.

Clause 10: each of the inner case and the outer case are more rigid than each of the shock absorbers.

Clause 11: the sensor is mounted to a circuit board defining a portion of the inner case.

Clause 12: the sensor is mounted to a flex circuit extending entirely through the inner case.

Clause 13: the inner case comprises an inner shield and a base; and the outer case comprises an outer shield and a frame.

Clause 14: a first one of the shock absorbers is between the inner shield and the outer shield; and a first one of the shock absorbers is between the base and the frame.

Clause 15: the flex circuit operably couples the sensor to a controller of the head-mountable device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame;
   an outer shield coupled to the frame;
   a base between the outer shield and the frame;
   an inner shield between the outer shield and the frame;
   a sensor mounted to a flex circuit, a portion of the flex circuit being secured between the base and the inner shield, the inner shield and the base enclosing an empty space between the sensor and the inner shield;
   a first shock absorber coupling the inner shield to the outer shield; and
   a second shock absorber coupling the base to the frame.

2. The head-mountable device of claim 1, further comprising:
   an optical module; and
   a motor for moving the optical module, wherein the first shock absorber and the second shock absorber are configured to absorb vibrations at a frequency generated by the motor.

3. The head-mountable device of claim 1, further comprising a fan for moving air through the head-mountable device, wherein the first shock absorber and the second shock absorber are configured to absorb vibrations at a frequency generated by the fan.

4. The head-mountable device of claim 1, wherein:
   the first shock absorber is adhered to each of the inner shield and the outer shield; and
   the second shock absorber is adhered to each of the base and the frame.

5. The head-mountable device of claim 1, wherein the first shock absorber and the second shock absorber are under compression when the head-mountable device is at rest, and the inner shield and the base are clamped onto the flex circuit by the first shock absorber and the second shock absorber.

6. The head-mountable device of claim 1, wherein the first shock absorber and the second shock absorber are configured to elastically deform to absorb strain applied from the outer shield or the frame, and the base and the inner shield decouples the sensor from strain applied from the first shock absorber and the second shock absorber.

7. The head-mountable device of claim 1, wherein the sensor is an inertial measurement unit.

8. The head-mountable device of claim 1, wherein the sensor comprises an accelerometer, a gyroscope, or a magnetometer.

9. The head-mountable device of claim 1, wherein each of the frame, the outer shield, the base, and the inner shield are more rigid than each of the flex circuit, the first shock absorber, and the second shock absorber.

10. A sensor assembly for a head-mountable device, the sensor assembly comprising:
    a sensor mounted between opposing sides of an inner case; and
    shock absorbers on opposing sides of the inner case and coupling the inner case to an outer case, wherein the shock absorbers are configured to elastically deform to absorb strain applied from the outer case, and the inner case encloses an empty space between the sensor and one of the opposing sides of the inner case and decouples the sensor from strain applied from the shock absorbers.

11. The head-mountable device of claim 10, wherein the shock absorbers are under compression when the sensor assembly is at rest.

12. The head-mountable device of claim 11, wherein the shock absorbers, while under compression, apply a clamping force to the inner case.

13. The head-mountable device of claim 10, wherein each of the inner case and the outer case are more rigid than each of the shock absorbers.

14. The head-mountable device of claim 10, wherein the sensor is mounted to a circuit board defining a portion of the inner case.

15. The head-mountable device of claim 10, wherein the sensor is mounted to a flex circuit extending entirely through the inner case.

16. A sensor assembly for a head-mountable device, the sensor assembly comprising:
   a sensor mounted to a flex circuit;
   an inner case surrounding the sensor; and
   shock absorbers on opposing sides of the inner case and coupling the inner case to an outer case, wherein the shock absorbers clamp the inner case to a portion of the flex circuit with a clamping force, without transferring the clamping force to the sensor.

17. The sensor assembly of claim 16, wherein:
   the inner case comprises an inner shield and a base; and
   the outer case comprises an outer shield and a frame.

18. The sensor assembly of claim 17, wherein:
   a first one of the shock absorbers is between the inner shield and the outer shield; and
   a second one of the shock absorbers is between the base and the frame.

19. The sensor assembly of claim 16, wherein each of the inner case and the outer case are more rigid than each of the shock absorbers and the flex circuit.

20. The sensor assembly of claim 16, wherein the flex circuit operably couples the sensor to a controller of the head-mountable device.

* * * * *

UNITED STATES PATENT AND TRADEMARK OFFICE
CERTIFICATE OF CORRECTION

PATENT NO. : 11,740,691 B1
APPLICATION NO. : 17/228588
DATED : August 29, 2023
INVENTOR(S) : Muhammad F. Hossain et al.

It is certified that error appears in the above-identified patent and that said Letters Patent is hereby corrected as shown below:

In the Claims

Column 16, Line 65 (Claim 11):
"head-mountable device"
Should read:
--sensor assembly--

Column 17, Line 1 (Claim 12):
"head-mountable device"
Should read:
--sensor assembly--

Column 17, Line 4 (Claim 13):
"head-mountable device"
Should read:
--sensor assembly--

Column 17, Line 7 (Claim 14):
"head-mountable device"
Should read:
--sensor assembly--

Column 17, Line 10 (Claim 15):
"head-mountable device"
Should read:
--sensor assembly--

Signed and Sealed this
Second Day of January, 2024

Katherine Kelly Vidal
*Director of the United States Patent and Trademark Office*